United States Patent [19]

Yokoyama et al.

[11] Patent Number: 5,185,074
[45] Date of Patent: * Feb. 9, 1993

[54] PROCESS FOR PRODUCING COLOR FILTER

[75] Inventors: Seiichiro Yokoyama; Hideaki Kurata, both of Sodegaura, Japan

[73] Assignee: Idemitsu Kosan Co., Ltd., Tokyo, Japan

[*] Notice: The portion of the term of this patent subsequent to Jan. 21, 2009 has been disclaimed.

[21] Appl. No.: 647,846

[22] Filed: Jan. 30, 1991

Related U.S. Application Data

[63] Continuation-in-part of Ser. No. 564,707, Aug. 7, 1990, abandoned, which is a continuation of Ser. No. 384,259, Jul. 21, 1989, abandoned.

[30] Foreign Application Priority Data

| Aug. 15, 1988 | [JP] | Japan | 63-201907 |
| Dec. 26, 1988 | [JP] | Japan | 63-326089 |
| Dec. 26, 1988 | [JP] | Japan | 63-326090 |
| Apr. 11, 1989 | [JP] | Japan | 1-089768 |
| Jun. 1, 1989 | [JP] | Japan | 1-137542 |
| Jun. 5, 1989 | [JP] | Japan | 1-140981 |
| Sep. 14, 1990 | [JP] | Japan | 2-242670 |

[51] Int. Cl.$^5$ .................... C25D 13/04; C25D 13/12; G02B 5/20
[52] U.S. Cl. .................. 205/162; 204/181.1; 204/181.7; 359/885
[58] Field of Search .............. 204/56.1, 181.1, 181.4, 204/181.7, 15, 18.1, 37.1, 29; 350/311; 205/162

[56] References Cited

U.S. PATENT DOCUMENTS

| 4,522,691 | 6/1985 | Suginoya et al. | 204/18.1 |
| 4,902,592 | 2/1990 | Matsumura et al. | 204/18.1 |
| 5,041,582 | 8/1991 | Eida et al. | 556/143 |
| 5,082,539 | 1/1992 | Saji et al. | 205/162 |

FOREIGN PATENT DOCUMENTS

| 60-23802 | 2/1985 | Japan . |
| 60-23803 | 2/1985 | Japan . |
| 60-23804 | 2/1985 | Japan . |
| 60-23805 | 2/1985 | Japan . |
| 60-70200 | 4/1985 | Japan . |

Primary Examiner—John Niebling
Assistant Examiner—Brian M. Bolam
Attorney, Agent, or Firm—Frishauf, Holtz, Goodman & Woodward

[57] ABSTRACT

A process for producing color filters, which comprises dispersing or dissolving pigments and the like having spectral properties in three primary colors, and a structure reinforcing resin in an aqueous medium, in the presence of a surfactant comprising a ferrocene compound, to prepare micelle solutions of dispersions in each color, and dipping the patterned electroconductive transparent substrate to be subjected to electrolytic treatment in each color, and thus forming a color-separated filter on the substrate. The color filter produced according to the above process can be utilized for display elements of filters, such as liquid crystal display devices, electrochromic display devices, latitude display devices, plasma display panels, spectroscopic devices, solid-state photographic devices and dimmers.

20 Claims, No Drawings

PROCESS FOR PRODUCING COLOR FILTER

CROSS REFERENCE TO RELATED APPLICATIONS

This application is a continuation-in-part application of application Ser. No. 07/564,707, filed Aug. 7, 1990, now abandoned, which was a continuation of application Ser. No. 07/384,259, filed Jul. 21, 1989, now abandoned.

BACKGROUND OF THE INVENTION

1. Field of the Invention

The present invention relates to a process for producing a color filter, and more particularly to a process for producing a color filter having a high film strength by the Micellar Disruption Method with the use of pigments or dyes having a spectral property of the three primary colors i.e. red (R), green (G) and blue (B).

2. Description of the Related Arts

For producing thin films including coloring matter, there have heretofore been known the vacuum deposition method, the heat CVD method, the plasma CVD method, the ultrahigh vacuum (ion beam, molecular beam epitaxy) method, the LB membrane method and the casting method.

These methods, however, require the operations of dissolving the starting material such as coloring matters in organic solvents or heating them, so it has been impossible to form hydrophobic substances having little resistance to heat, into thin films.

Recently, there have been developed the processes for forming thin films of various hydrophobic organic substances by the use of so called Micellar Disruption Method (Electrochemistry Society, 54th Spring convention F 201, 1987 and J. Am. Chem. Soc., 109 5881 (1987)).

According to said Micellar Disruption Method, thin films of various hydrophobic substances can be efficiently produced, and said method has attracted attention as an advantageous process in industry.

Thin films of the three primary colors of RGB can be formed and a color filter can be produced by said Micellar Disruption Method. However, there are disadvantages in that the thin film obtained by the Micellar Disruption Method has low strength because of its porosity, though the phenomenon of electrical conductance can be observed, and further a thin film does not have the requisite strength for panel formation such as to withstand rubbing. So it was necessary to increase the strength of the thin film for precise patterning. For increasing the strength of the thin film, the method in which a top coat using acryl/epoxy-based polymer is formed is usually carried out. There have been a problem that the electrical conductivity of the film, which is a characteristic feature of the Micellar Disruption Method is lost by forming said top coat (protect coat).

The present inventors have studied earnestly to develop a process for producing a color filter with improved film strength without losing the electrical conductivity.

SUMMARY OF THE INVENTION

As the result, it has been found that the above object can be attained by making a structure reinforcing resin dispersed or soluble with the use of a surfactant comprising ferrocene derivative in an aqueous medium and by introducing the structure reinforcing resin by a Micellar Disruption Method into the RGB film at the same time of producing a thin film of RGB or after producing a thin film of RGB. The present invention has been accomplished according to the above.

That is, the present invention provides a process (process I) for producing color filters, which comprises dispersing or dissolving pigments or dyes having spectral properties in the three primary colors of red, green, and a blue and structure reinforcing resin in an aqueous medium in the presence of a surfactant comprising ferrocene derivative to prepare micelle solutions or dispersions in each color; dipping a patterned transparent electroconductive substrate successively into the micelle solutions or dispersions in each color, to be subjected to electrotreatment in every color; and thereby forming a color-separated filter on said substrate. The present invention further provides a process (process II) for producing color filters, which comprises dispersing or dissolving pigments or dyes having spectral properties of the three primary colors of red, green, and blue in an aqueous medium in the presence of a surfactant comprising a ferrocene derivative, to prepare micelle solutions or dispersions in each color; successively dipping a patterned electroconductive transparent substrate, to be subjected to electrotreatment in every color; to form a color-separated filter on said substrate; and then dipping said substrate into the micelle solutions or dispersions obtained by dispersing or dissolving the structure reinforcing resin in an aqueous medium in the presence of a surfactant comprising a ferrocene derivative, to be subjected to electrotreatment; and thus forming a thin film of reinforcing agent on above-mentioned color-separated filter.

DESCRIPTION OF PREFERRED EMBODIMENTS

In the process of the present invention, as the usable material of coloring matter, there may be mentioned the coloring matters exhibiting the three primary colors of light, i.e. red, green and blue hydrophobic coloring matters, and if necessary, black hydrophobic coloring matter for BM (black matrix) formation. As the red coloring matters, there may be mentioned a perylene type pigment, a lake pigment, an azo type pigment, a quinacridone type pigment, an anthraquinone type pigment, an anthracene type pigment, etc. For example, there may be mentioned a perylene pigment, a lake pigment (Ca, Ba, Sr and Mn), quinacridone, naphthol AS, a shikomin pigment, anthraquinone (Sudan I, II, III, R), disazo, benzopyrane, a cadmium sulfide type pigment, a Fe (III) oxide type pigment, etc. and among them, the perylene pigment and the lake pigment are preferred. Also, as the green coloring matters, there may be mentioned a halogen-poly-substituted phthalocyanine type pigment, a halogen-poly-substituted copper phthalocyanine type pigment or a triphenylmethane type basic dye, etc. For example, there may also be mentioned a chloro-poly-substituted phthalocyanine, its copper complex or a barium triphenylmethane dye, etc. As the blue coloring matters, there may be mentioned a copper phthalocyanine type pigment, an indanthrone type pigment, an indophenol type pigment or a cyanine type pigment, etc. For example, there may be mentioned phthalocyanine metal complexes such as chlorocopperphthalocyanine, chloroaluminumphthalocyanine, phthalocyanine vanadate, magnesium phthalocyanine, zinc phthalocyanine, iron phthalocyanine, cobalt phthalocyanine, etc.; phthalocyanine, merocyanine, indophenole blue, etc.

Further examples are the hydrophobic compounds among the coloring matters each for electronics, recording, light-sensitive chromism, photos, energy use, biomedicals, and coloring matters for foods and cosmetics, dyes, pigments, and coloring matters for specific coloring which are listed in "Color Chemical Cyclopedia", CMC CO., Ltd., pp 542-717, Mar. 28, 1988.

The shape and size of these coloring matters are not limited, but powder with a particle size of not more than 10 μm is preferably used.

Then, in the present invention, as an aqueous medium used for the formation of a thin film, various media such as water, a mixture of water and alcohol, a mixture of water and acetone and so on can be mentioned.

In the present invention, as a micelle forming agent to make the above material of coloring matters dispersed and soluble, a surfactant comprising a ferrocene derivative can be used. Here the ferrocene derivatives can include various ones, but for example, there may be mentioned the following six kinds of (1) to (7).

Examples of such ferrocene derivatives include, (1) ferrocene derivatives in which a ferrocene compound (ferrocene or ferrocene derivative having a suitable substituent (e.g., an alkyl group, and an acetyl group)) is bonded to a cationic surfactant of the ammonium type (preferably the quaternary ammonium type) having a main chain with 4 to 16 carbon atoms (preferably 8 to 14). If the number of carbon atoms in the main chain is too small, no micell is formed, and if it is too large, the resulting ferrocene derivatives are not soluble in water. The ferrocene compound is bonded to the surfactant in various embodiments. These embodiments are classified into three types (A), (B) and (C). Type (A) is an embodiment in which the ferrocene compound is bonded to the terminal of the main chain of the surfactant, type (B) is an embodiment in which the ferrocene compound is bonded to an intermediate point of the main chain, directly or through an alkyl group, and type (C) is an embodiment in which the ferrocene compound is incorporated in the main chain. Ferrocene derivatives of this ammonium type are represented by the general formula:

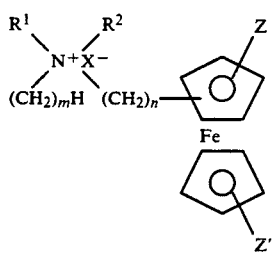

wherein $R^1$ and $R^2$ are each a hydrogen or an alkyl group having 1 to 4 carbon atoms (but not exceeding m as described hereinafter), Z and Z' are each a hydrogen or a substituent (methyl group, ethyl group, methoxy group or carbomethoxy group), X is a halogen, and m and n are integers satisfying the requirements: $m \geq 0$, $n \geq 0$, and $4 \leq m+n \leq 16$, the general formula:

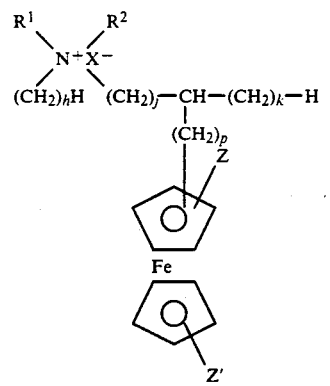

wherein $R^1$, $R^2$, X, Z and Z' are the same as described above (provided that the number of carbon atoms of $R^1$ and $R^2$ does not exceed h as described hereinafter), and h, j and k are integers satisfying the requirements: $h \geq 0$, $j \geq 0$, $k \geq 1$ and $3 \leq h+j+k \leq 15$ and p is an integer satisfying the requirement: $0 \leq p \leq k-1$, the general formula:

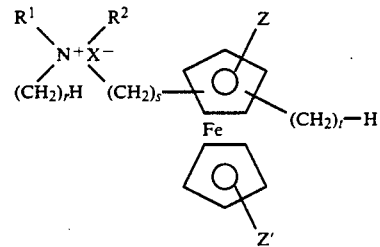

wherein $R^1$, $R^2$, X, Y, Z and Z' are the same as described above (provided that the number of carbon atoms of $R^1$ and $R^2$ does not exceed r as described hereinafter), and r, s and t are integers satisfying the requirements: $r \geq 0$, $s \geq 0$, $t \geq 1$, and $4 \leq r+s+t \leq 16$, or the general formula:

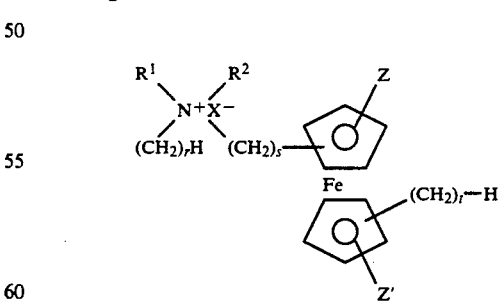

wherein $R^1$, $R^2$, X, Y, Z, Z', r, s and t are the same as described above.

Next, as (2) the ferrocene derivatives of other type, there may be mentioned ferrocene derivatives of ether type represented by the general formula:

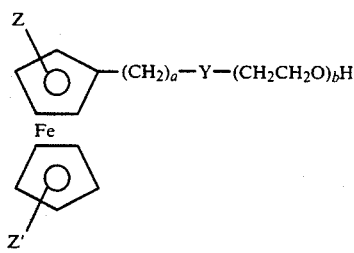

In the formula, a is an integer of 2 to 18, and b is a real number of 2.0 to 100.0. Since a is an integer of 2 to 18 as described above, an alkylene group having 2 to 18 carbon atoms such as an ethylene group, a propylene group, etc. is interposed between the carbon atom in the ring and Y. Also, b is not only an integer of 2.0 to 100.0, but also a real number containing these, and represents an average value of recurring numbers of the oxyethylene group ($-CH_2CH_2O-$) constituting the ferrocene derivative. Y in the above general formula represents an oxygen ($-O-$) or an oxycarbonyl group

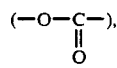

and Z and Z' are each a hydrogen or substituent as described above.

These ferrocene derivatives of ether type can be prepared according to the method and the like described in the specification of International Patent Application WO 89/01939.

Further, as (3) the ferrocene derivatives of other type, there may be mentioned ferrocene derivatives of pyridinium type represented by the general formula:

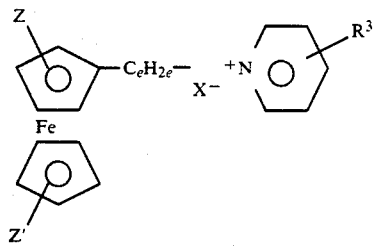

In the formula, Z, Z' and X are the same as described above, $R^3$ is an alkyl group having 1 to 4 carbon atoms, an alkoxy group having 1 to 4 carbon atoms, a carboalkoxy group having 1 to 5 carbon atoms, a hydroxyl group, carboxyl group, sulfonic acid group. $C_eH_{2e}$ represents a straight or a branched alkylene group having 1 to 16 carbon atoms. Specific examples of $C_eH_{2e}$ are a straight alkylene group including a polymethylene group $(CH_2)_e$ such as a tetramethylene group, a pentamethylene group, an octamethylene group, an undecamethylene group, a dodecamethylene group, and a hexadecamethylene group, or a branched alkylyne group such as 2-methylundecamethylene group, and 4-ethylundecamethylene group.

These ferrocene derivatives of pyridinium type can be prepared according to the methods and the like described in Japanese Patent Application Laid-Open No. 226894/1989.

Another type of ferrocene derivatives (4) are those represented by the general formula:

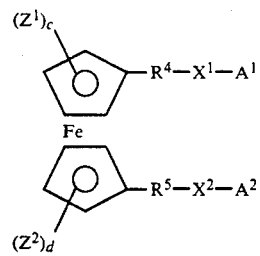

wherein $R^4$ and $R^5$ are each a straight chain or a branched chain alkylene group having 1 to 14 carbon atoms, $X^1$ and $X^2$ and each $-O-$ or

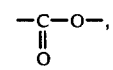

$A^1$ and $A^2$ are each

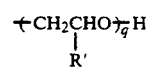

($R'$ is a hydrogen or a methyl group, and q is a real number of 2 to 70), $Z^1$ and $Z^2$ are each a hydrogen, a methyl group, a methoxy group, an amino group, a dimethylamino group, a hydroxyl group, an acetylamino group, a carboxyl group, methoxycarbonyl group, an acetoxyl group, an aldehyde group or a halogen, c and d are each an integer of 1 to 4.

These ferrocene derivatives can be produced according to the process described in the specification of Japanese Patent Application Laid-Open No. 83387/1990, for instance.

Another type of ferrocene derivatives (5) are represented by the general formula:

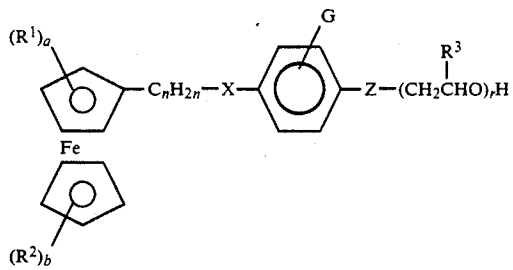

wherein X is $-CH_2-$, $-O-$,

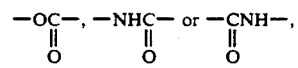

and Z indicates $-O-$ or

G indicates a hydrogen, a methyl group or an ethyl group, $R^1$ and $R^2$ are each H, $NH_2$, $N(CH_3)_2$, $CH_3$, $CH_3O$, OH or a halogen, and $R^3$ is a hydrogen or a methyl group, n is an integer of 0 to 10, r is a real number of 2 to 70, a and b are each an integer of 1 to 4. These ferrocene derivatives can be produced according to the process described in the specification of Japanese Patent Application Laid-Open No. 45370/1989.

Still another type of ferrocene derivatives (6) are represented by the general formula:

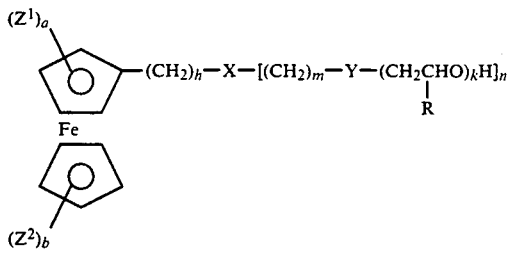

wherein $Z^1$ and $Z^2$ are each H, $CH_3$, $CH_3O$, $NHCOCH_3$, $N(CH_3)_2$, $COCH_3$, $COOCH_3$ or a halogen, X is

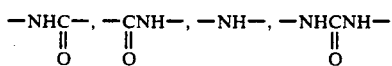

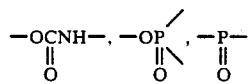

or $-SO_r$ (r is an integer of 0 to 3), Y is $-O-$ or

and R is a hydrogen or a methyl group, k is a real number of 2 to 70, h is an integer of 2 to 18, m is an integer of 0 to 4, n indicates 1 or 2, and a and b are each an integer of 1 to 4.

These ferrocene derivatives can be produced according to the process described in the specification of Japanese Patent Application Laid-Open No. 96585/1990.

Furthermore, another type of ferrocene derivatives (7) are represented by the general formula:

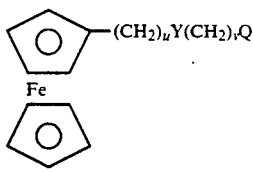

wherein Y is $-O-$ or

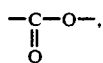

Q is

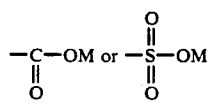

(M: alkali metal or alkaline earth metal), u is an integer of 1 to 18, and v is an integer of 0 to 4.

These ferrocene derivatives can be produced according to the process described in the specification of Japanese Patent Application Laid-Open No. 250892/1990.

Also, a structure reinforcing agent (or an agent for reinforcing structure) to be used in the present invention can bond particles of materials of coloring matter stably after formation of film.

As said structure reinforcing agents, various ones may be used so long as they can be dispersed or soluble by micelle forming agent comprising the above ferrocene derivative to form micelle solution or dispersion, and can bond particles of materials of coloring matter stably by carrying ou electrolytic treatment. Here, three types can be mentioned as follows.

The first type is those which have generally been used as adhesives, for example, an epoxy resin type, a polyvinylacetate type, a poly(methyl methacrylate) type, etc. These adhesives may be ones which have adhesive force as they are, or may be ones which turn into an adhesive force by heating, a radical initiator, an UV ray, etc. The second type is those which have generally been used as an electrolytic polymer film substrate, for example, pyrrole, aniline, thiophene, viologen, etc. These materials electrolytically polymerize during the formation of film to improve film strength. The third type is those which have generally been used as protective film agents, for example, polyvinyl alcohol, polyacrylic acid, polymethacrylic acid, polyethylene glycol, polyvinyl butyral, etc. In the present invention, polyethylene glycol, poly(methyl acrylate) type resin, epoxy type resin, polysiloxane, and derivative and copolymer of the above poly(methyl acrylate) type resin or epoxy type resin are preferably used singly or in combination. Further, an electrically conductive transparent particle such as ITO (a mixed oxide Of indium oxide and tin oxide) and tin oxide can be added to these structure reinforcing resins.

In the process (I) of the present invention, a micelle forming agent comprising the above ferrocene derivative, a supporting salt, a material of coloring matter and a structure reinforcing resin are first placed in an aqueous medium and thoroughly dispersed by the use of supersonic waves, a homogenizer or a stirrer, for forming a micelle. Thereafter, if necessary, excessive material of coloring matter and a structure reinforcing resin are removed, and the micelle solution (or dispersion) thus obtained is subjected to electrotreatment (or electrolytic treatment) using the transparent electrode while allowing it to stand or by somewhat stirring. During the electrolytic treatment, the above material of coloring matter and a structure reinforcing resin may be supplementarily added to the micelle solution (dispersion); or there may be provided in a recycle circuit in which the micelle solution in the vicinity of the anode is withdrawn out of the system, the material of coloring matter and structure reinforcing resin are added to the withdrawn micelle solution (dispersion) and thoroughly stirred, and then the resulting solution is returned to the vicinity of the cathode. The concentration of the micelle forming agent at this time is not critical, but may be selected in the range of 10 μM to 0.1 mM, preferably 0.5 mM to 5 mM. On the other hand, the concentration of the material of coloring matter may be a saturated concentration or higher.

The amount of the above structure reinforcing agent may be varied depending on the kinds thereof, but preferably it is added so as to become a concentration of 10 μM to 100 mM to the micelle solution. Also, the electrolytic conditions are determined appropriately depending on various circumstances. Usually, the liquid temperature is 0° to 90° C. and preferably 20° to 70° C., the voltage is between oxidation-reduction potential of the ferrocene derivative as micelle forming agent and potential capable of generating hydrogen, specifically is 0.1 to 1.5V and preferably 0.3 to 1.0V, the current density is not more than 10 mA/cm$^2$ and preferably 50 to 300 $\mu$A/cm$^2$.

Upon performing this electrolytic treatment, the reaction based on the principle of the Micellar Disruption Method proceeds. Concentrating on the behavior of the Fe ion in the ferrocene derivative, $Fe^{2+}$ of the ferrocene is converted into $Fe^{3+}$ on an anode, leading to the breakdown of the micelle, and particles of a material of coloring matter and a structure reinforcing resin are deposited on the anode (transparent electrode). On the other hand, $Fe^{3+}$ oxidized on the anode is reduced to $Fe^{2+}$ on the cathode, the original micelle is recovered, and therefore, a film forming operation can be carried out repeatedly using the same solution.

Electrolytic treatment as described above forms a desired thin film of the material of coloring matter containing a structure reinforcing agent on the anode (transparent electrode).

The supporting salt (supporting electrolyte) to be used in the process of the present invention as described above is added, if necessary, in order to control the electrical conductance of the aqueous medium. The amount of the supporting salt added may be the range that does not prevent the deposition of the material of coloring matter and the structure reinforcing resin dissolved or dispersed therein, but usually, a concentration of about 0 to 300 times, preferably about 50 to 200 times that of the above micelle forming agent.

Electrolysis may be carried out without using this supporting salt, and in this case, a high purity thin film containing no supporting salt can be prepared. Also, in the case of using the supporting salt, the kinds of the supporting salt are not particularly limited so long as it can control the electrical conductance of the aqueous medium without preventing formation of the micelle or deposition of the above material of coloring matter and structure reinforcing agent on the electrode.

More specifically, sulfuric acid salts (salts of lithium, potassium, sodium rubidium or aluminum), acetic acid salts (salts of lithium, potassium, sodium, rubidium, beryllium, magnesium, calcium, strontium, barium or aluminum), salts of halides (salts of lithium, potassium, sodium, rubidium, calcium, magnesium or aluminum), salts of water-soluble oxides (salts of lithium, potassium, sodium, rubidium, calcium, magnesium or aluminum), which are generally and widely used as supporting salts, are suitable.

As the supporting substrate used in the process of the present invention, a glass substrate such as blue plate glass, white plate glass, alkali-free glass (for example, 7059 produced by Corning Glass Works, NA 45 produced by HOYA Co., Ltd.), low-expansion glass, quartz glass and so on, and a polymer plate such as polyethylene terephthalate are preferably used. The material of the transparent electrode is sufficient if it is a metal more noble than the oxidation-reduction potential (+0.15 to 0.30V against saturated calomel electrode) of the ferrocene derivatives or an electrically conductive substance. More specifically, ITO, tin oxide and electrically conductive polymer film, etc. may be mentioned.

In order to form a thin film of hydrophobic coloring matter of the three primary colors constituting the color filter, it may be carried out by adding any one of hydrophobic coloring matter of red, green and blue into an aqueous medium and conducting the aforesaid operation to form a thin film of a desired hue by the desired pattern, and then repeating the above operation by changing the kind of the hydrophobic coloring matter. By repeating the above operation for at least one color in addition to the three primary colors (red, green and blue), a thin film of hydrophobic coloring matter can be formed on each transparent electrode.

Further, a color filter can be prepared in the presence of hydrophobic coloring matter of red, green or blue at the same time and applying the Micelle Disruption Method thereto.

Thus, the strength of the thin film of hydrophobic coloring matter can be improved by adding a structure reinforcing resin into a micelle solution (or dispersion) during the formation of thin film of color filter, to precipitate a structure reinforcing resin and a hydrophobic coloring matter.

In process II of the present invention, at first, a micelle solution (or dispersion) containing each coloring matter is prepared by dispersing or dissolving the above hydrophobic coloring matter of three primary colors using a surfactant comprising a ferrocene derivative, and also a micelle solution (or dispersion) containing resin is prepared separately by dispersing or dissolving the above structure reinforcing resin in an aqueous medium using a surfactant comprising ferrocene derivative. The micelle solution (or dispersion) containing coloring matter is prepared in the same manner as in the above micelle solution (or dispersion) containing a resin except that said solution (or dispersion) does not contain a structure reinforcing resin. The micelle solution (or dispersion) containing a resin is prepared in the same manner as in the above micelle solution (or dispersion) containing coloring matter except that said solution (or dispersion) does not contain a hydrophobic coloring matter.

And after a thin film of color filter not containing a structure reinforcing resin is formed on a substrate by carrying out the same operation as above with the use of a micelle solution containing the above coloring matter, said substrate of thin film of a color filter is introduced into the micelle solution containing the above resin and treated with electricity, to form a thin film of a reinforcing agent on a color filter. The operation in this time can be carried out under the same conditions as described above. Thus, the strength of the thin film of the hydrophobic coloring matter can be improved by introducing particles of a structure reinforcing resin into the holes of a thin film of hydrophobic coloring matter in a color filter.

Further, for the thin film obtained in the above processes (I) and (II), it is effective to carry out a post-treatment such as washing with electricity, washing with a solvent, heat treatment and so on. If, particularly heat treatment is carried out, a more stable color filter can be obtained. This is because, by the heat treatment, it can be considered that the aforesaid particles cause sintering with each other, whereby a film which is denser, having a strong bonding force of the particles with each other and stability, can be developed. This heat treatment is carried out in, for example, an electric furnace, but the methods for heating the thin film are not particularly limited.

The heating temperature and the heating time may vary depending on the kinds of the hydrophobic substance, but it may be in the range wherein the film formed by the Micellar Disruption Method remains porous and its bonding force becomes high. The heating temperature is preferably 80° to 200° C., more preferably 80° to 150° C., and the heating time is preferable in the range of 5 minutes to 10 hours, more preferably 30 minutes to 2 hours.

As described above, according to the present invention a, color filter having a film hardness of 4H or higher according to the pencil hardness test, maintaining the electrical conductivity, which is a characteristic feature of the Micellar Disruption Method. And it becomes possible to carry out a panel formation such as rubbing.

Accordingly, the color filter prepared by the process of the present invention can be utilized, for various display devices such as a liquid crystal display device, an electrochromic display device, a latitude display device, a plasma display panel, a spectroscopic device, a solid photographic device, a dimmer, etc. or a filter. More specifically, it can be effectively utilized in the field of personal computers of the lap top type, word processors, work stations, aurora visions, liquid crystal projectors, liquid crystal color TVs, liquid crystal color filters, color tone glass, overhead projectors (OHP), internal panels for cars, and machinery monitors.

The present invention is described in greater detail with reference to the following examples and comparative examples.

EXAMPLE 1

On a glass substrate having a face resistance (surface resistance) of 20 $\Omega/cm^2$ as an ITO film (NA45: produced by HOYA Co., Ltd., 300 square), a solution in which a resisting agent of ultraviolet ray setting type (IC-28/T3, produced by Fuji Hunt Electronics Technology Co., Ltd.) was diluted with xylene to ½ time in concentration, was spin coated at a revolution number of 1,000 rpm. After spin coating, said substrate of the resist/ITO was prebaked at 80° C. for 15 minutes, and then, set to the exposurer.

With the use of a mask for stripe pattern of 100 μm in line width, 20 μm in gap, 155 mm in line length, a high-pressure mercury-vapor lump of 2 kW (exposure capacity: 10 mW/$cm^2$.second), and with a proximity gap of 70 μm, the substrate was subjected to an exposure of 60 seconds. Then, the substrate was developed with an alkali developer, rinsed with pure water, and postbaked at 180° C. Next, an aqueous solution of 1M $FeCl_3$, 1N HCl, 0.1N $HNO_3$, and 0.1N Ce $(NO_3)_4$ was prepared as an etching solution, and ITO of said substrate was subjected to etching with the etching solution. The completion of etching was determined by electric resistance. Said etching took a period of about 40 minutes. Then, the substrate was rinsed with pure water, and the resist was removed with 1N NaOH.

Subsequently, as a resisting agent for forming a black matrix, a mixture of CK with CR, CG, and CB (produced by Fuji Hunt Electronics Technology Co., Ltd.) each in the amount of 3:1:1:1 part by weight was used, the ITO patterning glass substrate formed as above was revolved at 10 rpm, 30 cc of resisting agent was sprayed on it, then the revolution number was raised to 2,500 rpm, to form a uniform film on the substrate. The substrate after spin coating was prebaked at 80° C. for 15 minutes.

With the use of a mask designed for a black matrix (90×310 μm square—20 μm in line width), while position adjusting with an exposurer having a high-pressure mercury lump of 2 kW (exposure capacity: 100 mJ/$cm^2$ second) and also alignment function, said substrate was subjected to exposure for 200 seconds. Then, the substrate was developed with an alkali developer, in which Fuji Hunt CD (produced by Fuji Hunt Electronics Technology Co., Ltd.) was diluted with pure water to ¼ time in concentration, rinsed with pure water, and postbaked at 200° C. for 100 minutes.

In 4 L (L=liter) of pure water, a compound (FPEG) represented by:

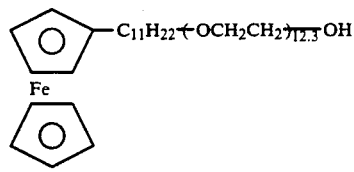

(produced by Dozin Chemical Co., Ltd.), LiBr (produced by Wako Junyaku Industry Co., Ltd.), Chromophthal A 2B (produced by Ciba Geigy Co.) and polyethylene glycol were placed, to be solutions each having a concentration of 2 mM, 0.1M, 10 g/L and 5 g/L, respectively, dispersed by an ultrasonic homogenizer for 30 minutes, to obtain a micelle solution. Into said micelle solution, said ITO patterned substrate was dipped, and a potentiostat was connected with line R of the stripe, subjected to a controlled potential electrolysis of 0.9V, to obtain a thin film of color filter R. The thin film was washed with pure water, and prebaked in an oven at 180° C.

Moreover, films were formed under the same conditions as in the formation of the film of R, except that Heliogen Green L9361 (produced by BASF Co.) for G was used in a concentration of 15 g/L and that Heliogen Blue K7080 (produced by BASF Co.) for B was used in a concentration of 9 g/L. Thus color filter films of RGB were prepared.

Subsequently, the resulting thin film of color filter was placed in sputtering equipment, and ITO was sputtered, to form a ITO thin film of about 1,700 Å. Further on it, resisting agent (IC-28/T3 of ultraviolet ray setting type (produced by Fuji Hunt Electronics Technology Co., Ltd.) was spin coated at a revolution number of 1,000 rpm, and after spin coated, prebaked at 80° C. for 15 minutes. Then, the substrate of said resist/ITO/color filter was set on the exposurer. As the light source, high-pressure mercury-vapor lump of 2 kW (exposure capacity: 10 mW/$cm^2$.second) was used, with a proximity gap of 70 μm, and subjected to back exposure of 60 seconds. After being developed with an alkali developer, the substrate was rinsed with pure water, and postbaked at 180° C.

As an etching solution, an aqueous solution of 1M $FeCl_3$, 1N HCl, 0.1N $HNO_3$, and 0.1N Ce$(NO_3)_4$ was prepared, and an ITO of said substrate was subjected to etching with the etching solution. The end point of etching was determined by electric resistance. It took about 40 minutes to conduct said etching. After that, the substrate was rinsed with pure water, and the resist was removed with 1N NaOH.

In this way, an ITO thin film was formed only on a color filter portion and thus a color filter for a metal insulated metal type (MIM) liquid crystal panel which is provided with an electroconductive coating was obtained.

Next, the color filter thus produced was determined for its physical properties. The transmittance was measured on the basis of the transmittance of glass substrate, using a spectrophotometer (MCPD-1100, produced by Otsuka Electron Co., Ltd.). The value of the transmittance of each RGB was on the basis of 450 nm, 545 nm, 610 nm, respectively. The black matrix (BM) was evaluated with the use of a spectrophotometer similarly, with the minimum value of each wavelength (450 nm to 650 nm) was regarded as the absorptivity of the BM (BMOD). By the way, the higher the value is, the higher the light-shielding ability is, which means that the property as a BM is higher, too.

To determine the definition, the border of the BM and the color filter (thin film) was polaroided in 200 magnification by the use of an optical microscope, to measure, on the border, the distance between the points where said border becomes identical in optical density to each bulk of the BM and color filter. Therein, the smaller the distance is, the higher the definition (contrast) becomes.

The homogeneity of the color filter thin films was determined by spectromicroscopic photographs. From a homograph in 3,000 magnification, the maximum of unevenness of its surface was taken, to be standardized in average film thickness. The defects were indicated by the number in whole picture elements.

The contrast was determined according to the following procedure. First, on the surface of the color filter, 100 ml of polyamic acid resin monomer was applied, and then homogenized at a revolution number of 1800 rpm by the use of spin coater. Then, said resin monomer was cured at 250 C for 1 hour to be polyimide resin, and was subjected to rubbing, and oriented. On the counter electrode, polyamic acid resin monomer was spin coated on a stripe-patterned ITO glass substrate, and cured at 250° C. for 1 hour, to be polyimide resin, and after rubbing, between the above-mentioned color filter substrate and glass beads, TN (twist nematic) liquid crystal were orderly put in, sealed with adhesive agent, to complete the panel.

After a taken-out electrode mounting a driver IC was connected to FPC (flexible print circuit), MIM was made to work, and the contrast was determined. Also the surface resistance was measured in this condition, and lastly the thin film was measured for tensile hardness. The results of them are shown in Table 1.

EXAMPLE 2

On a glass substrate having a face resistance of 400 $\Omega/cm^2$ as an ITO film (NA45: produced by HOYA Co., Ltd., 300 square), ITO patterning substrate was formed in the same procedure as in Example 1.

Subsequently, as a resisting agent for forming black matrix, a mixture of CR, CG, and CB (produced by Fuji Hunt Electronics Technology Co., Ltd.) each in the amount of 1:1:1 part by weight was used, the ITO patterning glass substrate formed as above was revolved at 10 rpm, 30 cc of the resisting agent was sprayed on it, then the revolution number was raised to 2,500 rpm, to form a uniform film on the substrate. The substrate after spin coating was prebaked at 80° C. for 15 minutes.

With the use of a mask designed for black matrix (90×310 μm square—20 μm in line width), while position adjusting with an exposurer having a high-pressure mercury lump of 2 kW (exposure capacity: 100 mJ/cm² second) and also alignment function, said substrate was subjected to exposure for 200 seconds. Then, the substrate was developed with an alkali developer, in which Fuji Hunt CD (produced by Fuji Hunt Electronics Technology Co., Ltd.) was diluted with pure water to ¼ time in concentration, rinsed with pure water, and postbaked at 200° C. for 100 minutes.

In 4L of pure water, said FPEG (produced by Dozin Chemical Co., Ltd.), LiBr (produced by Wako Junyaku Industry Co., Ltd.), Chromophthal A 2B (produced by Ciba Geigy Co.) and polyethylene glycol were placed, to be solutions each having a concentration of 2 mM, 0.1M, 12 g/L and 2.5 g/L, respectively, dispersed by an ultrasonic homogenizer for 10 minutes, to obtain a micelle solution. Into said micelle solution, said ITO patterned substrate was dipped, and a potentiostat was connected with line R of the stripe, and subjected to a controlled potential electrolysis of 0.9V, to obtain a thin film of color filter R. The thin film was washed with pure water, and prebaked in an oven at 140° C.

Films were formed under the same conditions as in the formation of the film of R, except that Heliogen Green L9361 (produced by BASF Co.) for G was used in a concentration of 18 g/L, and that Heliogen Blue K 7080 (produced by BASF Co.) for B was used in a concentration of 12 g/L, and thus color filter films of RGB were obtained.

The resulting thin films were determined for physical properties in the same manner as in Example 1. The result is shown in Table 1.

EXAMPLE 3

The color filter thin film obtained in Example 2 was placed in the sputtering equipment, and ITO was sputtered to form ITO thin film of about 1,000 Å, and thus a color filter provided with electroconductive coating for TFT (thin film transistor driving liquid crystal type) was produced.

The result of determination for physical properties conducted in the same manner as in Example 1 is shown in Table 1.

EXAMPLE 4

The color filter thin film substrate obtained in Example 2 was revolved at 10 rpm, and an electroconductive transparent polymer (produced by Shinto-Chemitron Co.) was sprayed on it. Then, the revolution number was increased to 2,500 rpm, and a homogeneous film was formed on the substrate. The substrate after spin coating was prebaked at 80° C. for 15 minutes, to form a color filter provided with electroconductive coating.

The result of determination of physical properties conducted as in the same manner as Example 1 is shown in Table 1.

EXAMPLE 5

The color filter thin film substrate obtained in Example 2 was revolved at 10 rpm, and 30 cc of electroconductive polymer, in which ITO particles (I202: produced by Sumitomo Cement Co., Ltd.) was doped in a top coating agent (JSR 7265: produced by JSR Co.), was sprayed on it.

Then, the revolution number was increased to 2,500 rpm, and a homogeneous film was formed on the substrate. The substrate after spin coating was prebaked at 180° C. for 60 minutes, to form a color filter provided with electroconductive coating.

The results of determination for physical properties conducted in the same manner as in Example 1 is shown in Table 1.

EXAMPLE 6

On a glass substrate having a face resistance of 400 $\Omega/cm^2$ as ITO film (NA45: produced by HOYA Co., Ltd., 300 square), ITO patterning substrate was formed in the same procedure as in Example 1, and a black matrix was formed in the same manner, to produce an ITO patterned substrate.

In 4 L of pure water, said FPEG (produced by Dozin Chemical Co., Ltd.), LiBr (produced by Wako Junyaku Industry Co., Ltd.), and Chromophthal A 2B (produced by Ciba Geigy Co.) were placed, to be solutions each having a concentration of 2 mM, 0.1M and 12 g/L, respectively, dispersed by an ultrasonic homogenizer for 10 minutes, to obtain a micelle solution. Into said micelle solution, said ITO patterned substrate was dipped, and a potentiostat was connected with line R of the stripe, and subjected to a controlled potential electrolysis of 0.9V, to obtain a thin film of color filter R. The thin film was washed with pure water, and prebaked in an oven at 140° C.

Films were formed under the same conditions as in the formation of the film of R, except that Heliogen Green L9361 (produced by BASF Co.) for G was used in a concentration of 18 g/L, and that Heliogen Blue K 7080 (produced by BASF Co.) for B was used in a concentration of 12 g/L, and thus color filter films of RGB were obtained.

Further, in 4 L of pure water, said FPEG (produced by Dozin Chemical Co., Ltd.), LiBr (produced by Wako Junyaku Industry Co., Ltd.), and polyethylene glycol were placed, to be solutions each having a concentration of 2 mM, 0.1M, and 2.5 g/L, respectively, dispersed by an ultrasonic homogenizer for 10 minutes, to obtain a micelle solution. Into said micelle solution, the above-mentioned color filter was dipped, and a potentiostat was connected with all lines of RGB of the stripe, and subjected to a controlled potential electrolysis of 0.9V, to obtain a thin film of polyethylene glycol on the color filter.

The color filters for MIM, and STN (supertwisted nematic liquid crystal type) thus obtained were determined for physical properties in the same manner as in Example 1. The result is shown in Table 1.

EXAMPLE 7

The color filter thin film obtained in Example 6 was placed in the sputtering equipment, and ITO was sputtered to form ITO thin film of about 1,000 Å, and thus a color filter provided with electroconductive coating for TFT was produced.

The result of determination for physical properties conducted in the same manner as in Example 1 is shown in Table 1.

EXAMPLE 8

The procedure of Example 2 was repeated except that poly(methyl methacrylate) was used in place of polyethylene glycol, to form a color filter.

The physical properties of the color filter were determined in the same manner as in Example 1. The result is shown in Table 1.

EXAMPLE 9

The procedure of Example 6 was repeated except that poly(methyl methacrylate) in place of polyethylene glycol, to form a color filter.

The result of determination for physical properties conducted in the same manner as in Example 1 is shown in Table 1.

COMPARATIVE EXAMPLE 1

The color filter thin film substrate was prepared in the same manner as in Example 2 except that polyethyleneglycol was not used. The substrate was revolved at 10 rpm, and 30 cc of top coating agent (JSR 7265, produced by JSR Co.) was sprayed on it. Then, the revolution number was increased to 2,500 rpm, and a homogeneous film was formed on the substrate. The substrate after spin coating was prebaked at 180° C. for 60 minutes.

The result of determination of physical properties conducted in the same manner as Example 1 is shown in Table 1.

COMPARATIVE EXAMPLE 2

On a glass substrate having a face resistance of 400 $\Omega/cm^2$ as ITO film (NA45: produced by HOYA Co., Ltd., 300 square), an ITO patterning substrate was formed using the same procedure as in Example 1, and a black matrix was formed in the same manner to produce an ITO patterned substrate.

In 4L of pure water, said FPEG (produced by Dozin Chemical Co., Ltd.), LiBr (produced by Wako Junyaku Industry Co., Ltd.), and Chromophthal A 2B (produced by Ciba Geigy Co.) were placed, to be solutions each having a concentration of 2 mM, 0.1M, and 12 g/L, respectively, dispersed by an ultrasonic homogenizer for 10 minutes, to obtain a micelle solution. Into said micelle solution, said ITO patterned substrate was dipped, and a potentiostat was connected with line R of the stripe, and subjected to a controlled potential electrolysis of 0.9V, to obtain a thin film of color filter R. The thin film was washed with pure water, and prebaked in an oven at 140° C.

Films were formed under the same conditions as in the formation of the film of R, except that Heliogen Green L9361 (produced by BASF Co.) for G was used in a concentration of 18 g/L, and that Heliogen blue K 7080 (produced by BASF Co.) for B was used in a concentration of 12 g/L, and thus color filter films of RGB were obtained.

TABLE 1

| No. | Drive Circuit of Color Filter | Transmittance (%) R | G | B | BMOD (abs) | Definition of Border ($\mu$m) | Homogeneity of Film (%) | Surface Resistance ($\Omega/cm^2$) | Contrast | Hardness of Thin Film |
|---|---|---|---|---|---|---|---|---|---|---|
| Example 1 | MIM | 82 | 75 | 68 | 2.5 | 0.6 | 11 | 15 | 32 | 4H |
| Example 2 | MIM | 81 | 72 | 65 | 1.5 | 0.6 | 10 | 2014 | 35 | 4H |
| Example 3 | TFT | 82 | 73 | 66 | 1.5 | 0.5 | 13 | 14 | 45 | 9H |
| Example 4 | TFT | 81 | 76 | 63 | 1.4 | 0.5 | 12 | 211 | 40 | 4H |
| Example 5 | TFT | 82 | 74 | 68 | 1.2 | 0.5 | 11 | 1209 | 35 | 5H |
| Example 6 | MIM | 85 | 75 | 68 | 1.2 | 0.5 | 11 | 236 | 35 | 4H |

TABLE 1-continued

| No. | Drive Circuit of Color Filter | Transmittance (%) | | | BMOD (abs) | Definition of Border (μm) | Homogeneity of Film (%) | Surface Resistance (Ω/cm²) | Contrast | Hardness of Thin Film |
|---|---|---|---|---|---|---|---|---|---|---|
| | | R | G | B | | | | | | |
| Example 7 | TFT | 83 | 75 | 66 | 1.2 | 0.5 | 11 | 19 | 35 | 4H |
| Example 8 | MIM | 81 | 71 | 68 | 1.2 | 0.5 | 11 | 409 | 35 | 5H |
| Example 9 | MIM | 88 | 75 | 68 | 1.2 | 0.5 | 11 | 478 | 35 | 5H |
| Comparative Example 1 | MIM | 78 | 71 | 65 | 1.5 | 0.5 | 12 | 930 × 10⁶ | 25 | 4H |
| Comparative Example 2 | MIM | 68 | 62 | 58 | 1.5 | 0.5 | 11 | 103 | 31 | B |

What is claimed is:

1. A process for producing an electroconductive color filter, which comprises (a) dispersing or dissolving a pigment or a dye having spectral properties in three primary colors of red, green, and blue and a structure reinforcing resin in an amount of up to 0.5 part by weight per part by weight of the pigment or dye, in an aqueous medium in the presence of a surfactant comprising a ferrocene compound to prepare micelle solutions or dispersions in each of said colors; (b) dipping a patterned transparent electroconductive substrate successively into the micelle solutions or dispersions in each of said colors, to be subjected to electrolytic treatment at a voltage of 0.1 to 1.5V in every said color; and thereby forming an electroconductive color-separated filter on said substrate.

2. The process for producing a color filter as defined in claim 1, wherein the structure reinforcing resin is at least one resin selected from the group consisting of polyethylene glycol, poly(methyl acrylate), epoxy resin, polysiloxane, derivative and copolymer of said poly(methyl acrylate) or epoxy resin.

3. The process for producing an electroconductive color filter as defined in claim 1, wherein the dye or pigment is selected from the group consisting of a perylene pigment, a lake pigment, an azo pigment, a quinacridone pigment, an anthraquinone pigment, an anthracene pigment, a halogen-poly-substituted phthalocyanine pigment, a halogen-poly-substituted copper phthalocyanine pigment, a triphenylmethane basic dye, a copper phthalocyanine pigment, an indanthrone pigment, an indophenol pigment and a cyanine pigment.

4. The process for producing a color filter as defined in claim 1, wherein the dye or pigment is selected from the group consisting of quinacridone, naphthol AS, a skikomin pigment, a disazo pigment, benzopyrane, a cadmium sulfide pigment, an Fe(III) oxide pigment, a chloro-poly-substituted phthalocyanine, a copper complex of a chloro-poly-substituted phthalocyanine, a barium triphenylmethane dye, chlorocopperphthalocyanine, chloroaluminumphthalocyanine, phthalocyanine vanadate, magnesium phyhslovysninr, zinc phthalocyanine, iron phthalocyanine, cobalt phthalocyanine, merocyanine and indophenole blue.

5. The process for producing an electroconductive color filter as defined in claim 3, wherein the ferrocene compound is selected from the group consisting of

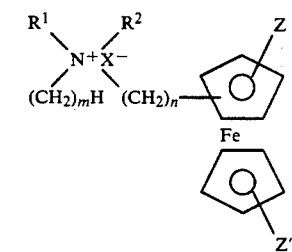
(a)

wherein $R^1$ and $R^2$ are each a hydrogen or an alkyl group having 1 to 4 carbon atoms and m and n are integers satisfying the following: $m \geq 0$, $n \geq 0$, and $4 \leq m+n \leq 16$;

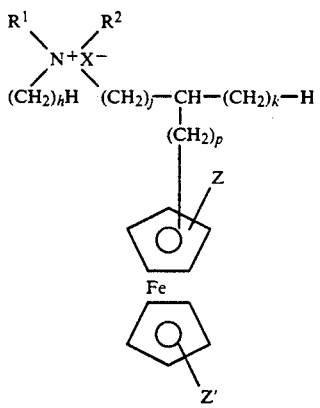
(b)

wherein h, j, k and p are integers satisfying the following: $h \geq 0$, $j \geq 0$, $k \geq 1$, $3 \leq h+j+k \leq 15$ and $0 \leq p \leq k-1$;

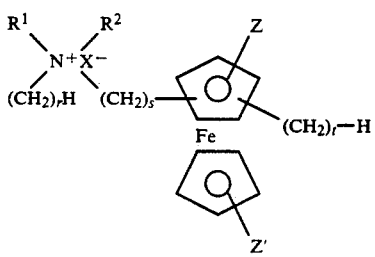
(c)

and r, s and t are integers satisfying the following: $r \geq 0$, $s \geq 0$, $t \geq 1$, and $4 \leq r+s+t \leq 16$;

(d)

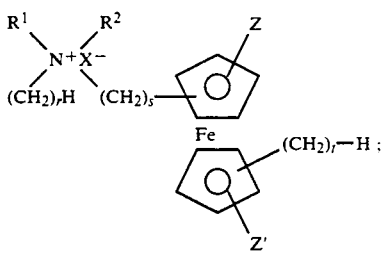

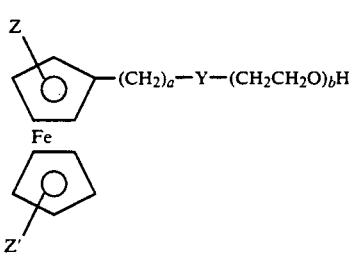

wherein a is an integer of 2 to 18, b is a real number of 2.0 to 100.0 and Y is an oxygen or an oxycarbonyl group;

(f)

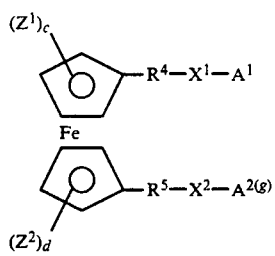

$R^3$ is an alkyl group having 1 to 4 carbon atoms, an alkoxy group having 1 to 4 carbon atoms, a carboalkoxy group having 1 to 5 carbon atoms, a hydroxyl group, a carboxyl group, a sulfonic acid group, $C_eH_{2e}$ is a straight or a branched alkylene group having 1 to 16 carbon atoms, Z and Z' are each a hydrogen, a methyl group, an ethyl group, a methoxy group or a carbomethoxy group, and X is a halogen;

(g)

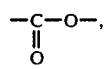

wherein $R^4$ and $R^5$ are each a straight chain or a branched chain alkylene group having 1 to 14 carbon atoms, $X^1$ and $X^2$ are each —O— or $$-\underset{\underset{O}{\|}}{C}-O-,$$

$A^1$ and $A^2$ are each

$R'$ is a hydrogen or a methyl group, and q is a real number of 2 to 70, $Z^1$ and $Z^2$ are each a hydrogen, a methyl group, a methoxy group, an amino group, a dimethylamino group, a hydroxyl group, an acetylamino group, a carboxyl group, a methoxycarbonyl group, an acetoxyl group, an aldehyde group or a halogen, c and d are each an integer of 1 to 4;

(h)

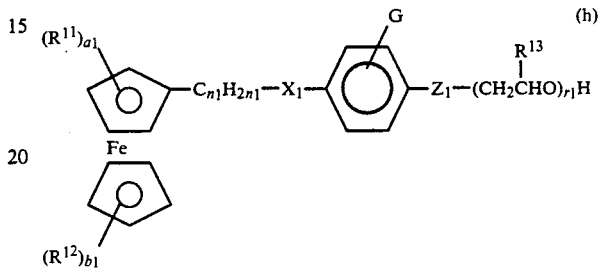

wherein $X_1$ is —CH$_2$—, —O—,

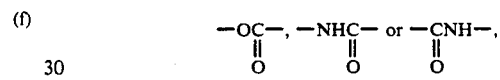

and $Z_1$ is —O— or

G is a hydrogen, a methyl group or an ethyl group, $R^{11}$ and $R^{12}$ are each H, NH$_2$, N(CH$_3$)$_2$, CH$_3$, CH$_3$O, OH or a halogen, $R^{13}$ is a hydrogen or a methyl group, $n_1$ is an integer of 0 to 10, $r_1$ is a real number of 2 to 70, and $a_1$ and $b_1$ are each an integer of 1 to 4;

(i)

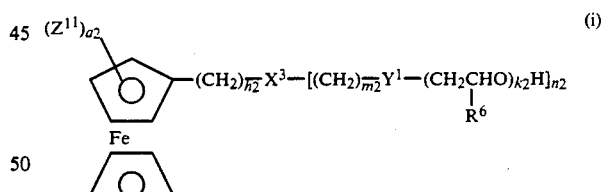

wherein $Z^{11}$ and $Z^{12}$ are each H, CH$_3$, CH$_3$O, NHCOCH$_3$, N(CH$_3$)$_2$, COCH$_3$, COOCH$_3$ or a halogen, $X^3$ is

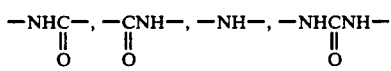

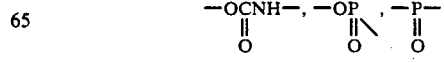

or —SO$_{r2}$, $r_2$ is an integer of 0 to 3, $Y^1$ is —O— or

and $R^6$ is a hydrogen or a methyl group; $k_2$ is a real number of 2 to 70, $h_2$ is an integer of 2 to 18, $m_2$ is an integer of 0 to 4, $n_2$ is 1 or 2, and $a_2$ and $b_2$ are each an integer of 1 to 4; and

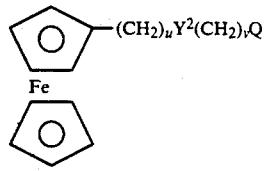
(j)

wherein $Y^2$ is —O— or

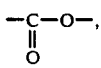

Q is

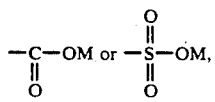

M is an alkali metal or alkaline earth metal, u is an integer of 1 to 18, and v is an integer of 0 to 4.

6. The process for producing an electroconductive color filter as defined in claim 5, wherein the structure reinforcing agent is selected from the group consisting of epoxy resin, polyvinylacetate, polylmethyl methacrylate, pyrrole, aniline, thiophene, viologen, polyvinyl alcohol, polyacrylic acid, polymethacrylic acid, polyethylene glycol, polyvinyl butyral, polysiloxane and combinations thereof and is in an amount of 0.2 to 0.5 part by weight per part by weight of the pigment or dye.

7. The process for producing an electroconductive color filter as defined in claim 6, wherein the ferrocene compound is in a concentration of 10 $\mu M$ to 0.1 mM.

8. The process for producing an electroconductive color filter as defined in claim 6, wherein the ferrocene compound is in a concentration of 0.5 mM to 5 mM.

9. The process for producing an electroconductive color filter as defined in claim 8, wherein the structure reinforcing agent is selected from the group consisting of polyethylene glycol, polymethacrylate), epoxy resins and polysiloxane, and is in a concentration of 10 $\mu M$ to 100 mM in the micelle solution or dispersion.

10. The process for producing an electroconductive color filter as defined in claim 9, wherein the electrolytic treatment is conducted at a liquid temperature of 20° to 70° C., a voltage of 0.3 to 1.0V and a current density of 50 to 300 $\mu A/cm^2$.

11. A process for producing an electroconductive color filter, which comprises (a) dispersing or dissolving a pigment or a dye having spectral properties of three primary colors of red, green, and blue in an aqueous medium in the presence of a surfactant comprising a ferrocene compound, to prepare micelle solutions or dispersions in each of said colors; (b) successively dipping a patterned electroconductive transparent substrate, to be subjected to electrolytic treatment in every said color, to form a color-separated filter on said substrate; and (c) then dipping said substrate into the micelle solutions or dispersions obtained by dispersing or dissolving a structure reinforcing resin in an amount up to 0.5 part by weight per part by weight of the pigment or dye, in an aqueous medium in the presence of a surfactant comprising a ferrocene compound, to be subjected to electrolytic treatment at a voltage of 0.1 to 1.5V; and thus forming a thin film of a reinforcing agent on said color-separated filter from step (b).

12. The process for producing a color filter as defined in claim 4, wherein the structure reinforcing resin is at least one resin selected from the group consisting of polyethylene glycol, poly(methyl acrylate) resin, epoxy resin, polysiloxane, and derivative or copolymer of said poly(methyl acrylate) resin or epoxy resin.

13. The process for producing an electroconductive color filter as defined in claim 11, wherein the dye or pigment is selected from the group consisting of a perylene pigment, a lake pigment, an azo pigment, a quinacridone pigment, an anthraquinone pigment, an anthracene pigment, a halogen-poly-substituted phthalocyanine pigment, a halogen-poly-substituted copper phthalocyanine pigment, a triphenylmethane basic dye, a copper phthalocyanine pigment, an indanthrone pigment, an indophenol pigment and a cyanine pigment.

14. The process for producing an electroconductive color filter as defined in claim 11, wherein the dye or pigment is selected from the group consisting of quinacridone, naphthol AS, a shikomin pigment, a disazo pigment, benzopyrane, a cadmium sulfide pigment, an Fe(III) oxide pigment, a chloro-polysubstituted phthalocyanine, a copper complex of a chloro-polysubstituted phthalocyanine, a barium triphenylmethane dye, chlorocopperphthalocyanine, chloroaluminumphthalocyanine, phthalocyanine vanadate, magnesium phthalocyanine, zinc phthalocyanine, iron phthalocyanine, cobalt phthalocyanine, merocyanine and indophenole blue.

15. The process for producing an electroconductive color filter as defined in claim 13, wherein the ferrocene compound is selected from the group consisting of

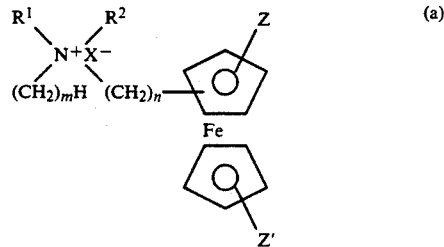
(a)

wherein $R^1$ and $R^2$ are each a hydrogen or an alkyl group having 1 to 4 carbon atoms and m and n are integers satisfying the following: $m \geq 0$, $n \geq 0$, and $4 \leq m+n \leq 16$;

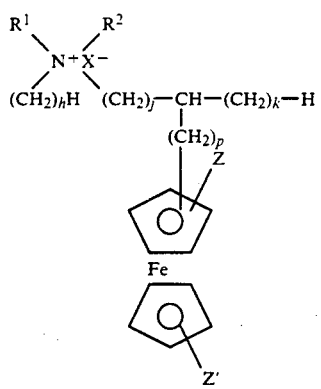
(b)

h, j, k and p are integers satisfying the following: $h \geq 0$, $j \geq 0$, $k \geq 1$ and $3 \leq h+j+k \leq 15$ and $0 \leq p \leq k-1$;

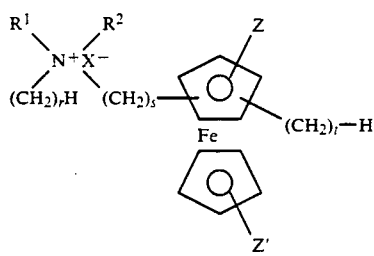
(c)

and r, s and t are integers satisfying the following: $r \geq 0$, $s \geq 0$, $t \geq 1$, and $4 \leq r+s+t \leq 16$;

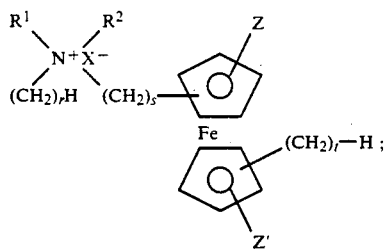
(d)

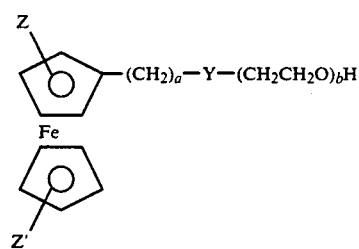
(e)

wherein a is an integer of 2 to 18, b is a real number of 2.0 to 100.0 and Y is an oxygen or an oxycarbonyl group;

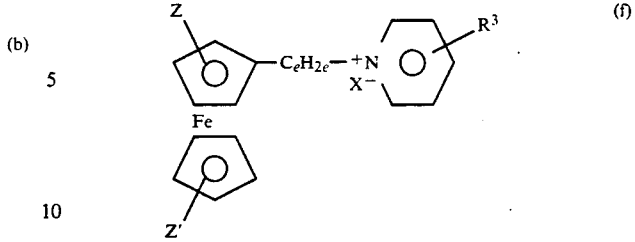
(f)

$R^3$ is an alkyl group having 1 to 4 carbon atoms, an alkoxy group having 1 to 4 carbon atoms, a carboalkoxy group having 1 to 5 carbon atoms, a hydroxyl group, a carboxyl group, a sulfonic acid group, $C_eH_{2e}$ a straight or a branched alkylene group having 1 to 16 carbon atoms, Z and Z' are each a hydrogen, a methyl group, an ethyl group, a methoxy group or a carbomethoxy group and X is a halogen;

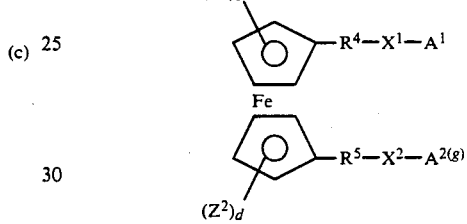

wherein $R^4$ and $R^5$ are each a straight chain or a branched chain alkylene group having 1 to 14 carbon atoms, $X^1$ and $X^2$ are each —O— or

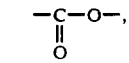

$A^1$ and $A^2$ are each

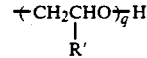

$R^1$ is a hydrogen or a methyl group, and q is a real number of 2 to 70, $Z^1$ and $Z^2$ are each a hydrogen, a methyl group, a methoxy group, an amino group, a dimethylamino group, a hydroxyl group, an acetylamino group, a carboxyl group, a methoxycarbonyl group, an acetoxyl group, an aldehyde group or a halogen, c and d are each an integer of 1 to 4;

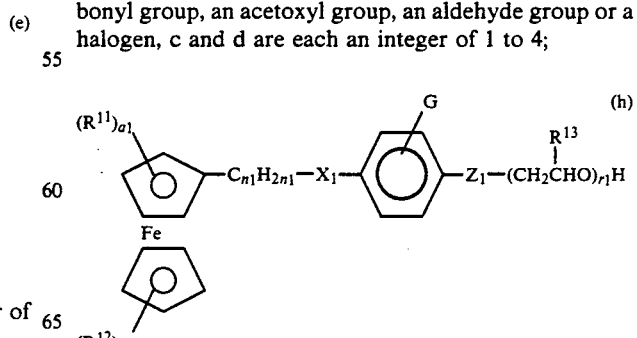
(h)

wherein $X_1$ is —CH$_2$—, —O—,

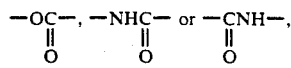

and $Z_1$ is —O— or

G is a hydrogen, a methyl group or an ethyl group, $R^{11}$ and $R^{12}$ are each H, $NH_2$, $N(CH_3)_2$, $CH_3$, $CH_3O$, OH or a halogen, $R^{13}$ is a hydrogen or a methyl group, $n_1$ is an integer of 0 to 10, $r_1$ is a real number of 2 to 70, and $a_1$ and $b_1$ are each an integer of 1 to 4;

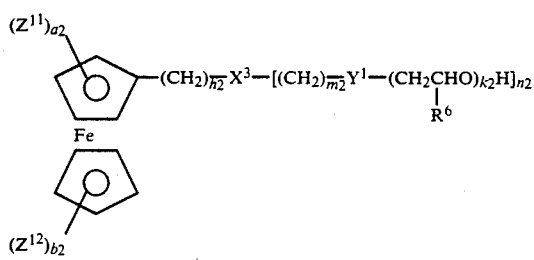

wherein $Z^{11}$ and $Z^{12}$ are each H, $CH_3$, $CH_3O$, $NHCOCH_3$, $N(CH_3)_2$, $COCH_3$, $COOCH_3$ or a halogen, $X^3$ is

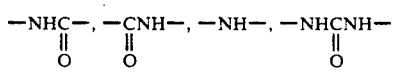

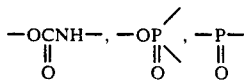

or $-SO_{r2}$, $r_2$ is an integer of 0 to 3, $Y^1$ is —O— or

and $R^6$ is a hydrogen or a methyl group; $k_2$ is a real number of 2 to 70, $h_2$ is an integer of 2 to 18, $m_2$ is an integer of 0 to 4, $n_2$ is 1 to 2, and $a_2$ and $b_2$ are each an integer of 1 to 4; and

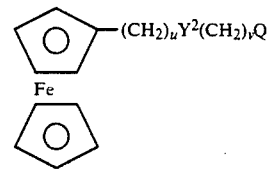

wherein $Y^2$ is —O— or

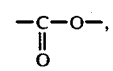

Q is

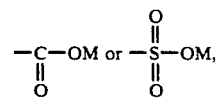

M is an alkali metal or alkaline earth metal, u is an integer of 1 to 18, and v is an integer of 0 to 4.

16. The process for producing an electroconductive color filter ad defined in claim 15 wherein the structure reinforcing agent is selected from the group consisting of epoxy resin, polyvinylacetate, polylmethyl methacrylate, pyrrole, aniline, thiophene, viologen, polyvinyl alcohol, polyacrylic acid, polymethacrylic acid, polyethylene glycol, polyvinyl butyral, polysiloxane and combinations thereof and is in an amount of 0.2 to 0.5 part by weight per part by weight of the pigment or dye.

17. The process for producing an electroconductive color filter as defined in claim 16, wherein the ferrocene compound is in a concentration of 10 μM to 0.1 mM.

18. The process for producing an electroconductive color filter as defined in claim 16, wherein the ferrocene compound is in a concentration of 0.5 mM to 5 mM.

19. The process for producing an electroconductive color filter as defined in claim 18, wherein the structure reinforcing agent is selected from the group consisting of polyethylene glycol, polymethacrylate), epoxy resins and polysiloxane, and is in a concentration of 10 μM to 100 mM in the micelle solution or dispersion.

20. The process for producing an electroconductive color filter as defined in claim 19, wherein the electrolytic treatment is conducted at a liquid temperature of 20° to 70° C., a voltage of 0.3 to 1.0V and a current density of 50 to 300 μA/cm².

* * * * *